US006655344B2

(12) United States Patent  (10) Patent No.: US 6,655,344 B2
Sager                     (45) Date of Patent:     Dec. 2, 2003

(54) ROTARY GEAR DEVICE

(76) Inventor: William F. Sager, 1552 John Anderson Dr., Ormond Beach, FL (US) 32074

( * ) Notice: Subject to any disclaimer, the term of this patent is extended or adjusted under 35 U.S.C. 154(b) by 0 days.

(21) Appl. No.: 10/091,650

(22) Filed: Mar. 5, 2002

(65)           Prior Publication Data

US 2003/0168035 A1 Sep. 11, 2003

(51) Int. Cl.$^7$ ................................. F02B 53/04
(52) U.S. Cl. ................. 123/238; 123/246; 123/241; 148/206.1; 148/201.3
(58) Field of Search .................. 123/246, 241, 123/204, 238; 418/206.1, 206.4, 206.5, 201.3

(56)           References Cited

U.S. PATENT DOCUMENTS

| | | | | |
|---|---|---|---|---|
| 1,155,335 A | * | 10/1915 | Bricknell et al. | 123/246 |
| 1,344,331 A | * | 6/1920 | Carrey | 123/238 |
| 1,656,538 A | * | 1/1928 | Smith | 123/246 |
| 2,159,744 A | * | 5/1939 | Maglott | 418/201.3 |
| 3,578,890 A | * | 5/1971 | Jensen | 418/206.1 |
| 3,693,601 A | * | 9/1972 | Sauder | 123/238 |
| 3,709,199 A | * | 1/1973 | Molyneaux | 123/246 |
| 3,782,340 A | * | 1/1974 | Nam | 123/204 |
| 4,702,206 A | * | 10/1987 | Harries | 123/246 |
| 5,101,782 A | * | 4/1992 | Yang | 123/204 |
| 5,108,275 A | | 4/1992 | Sager | 123/238 |
| 5,845,617 A | | 12/1998 | Sager | 418/201.3 |
| 6,325,604 B1 | * | 12/2001 | Du | 418/152 |

FOREIGN PATENT DOCUMENTS

| | | | | |
|---|---|---|---|---|
| DE | 3424310 A1 | * | 1/1986 | F02C/5/04 |
| DE | 3825372 A1 | * | 2/1990 | F01C/1/02 |
| DE | 4212921 A1 | * | 10/1993 | F01C/1/16 |

* cited by examiner

Primary Examiner—Thomas Denion
Assistant Examiner—Thai-Ba Trieu
(74) Attorney, Agent, or Firm—Garrettson Ellis Seyfarth Shaw

(57)           ABSTRACT

A rotary gear device comprises a housing a preferably multiple pairs of rotatable meshing gears in coaxial relation defining spaced teeth which extend helically in the direction of the axis of each gear. First chambers are formed by the meshing gears which move substantially longitudinally while shrinking in size to substantially zero volume as they rotate toward a dead center plane. Second chambers are formed between the spaced teeth rotating away from the dead center plane and increasing in volume. Various improvements are provided to this type of device, which maybe used as an internal combustion engine, a pump or as a chemical reactor.

20 Claims, 6 Drawing Sheets

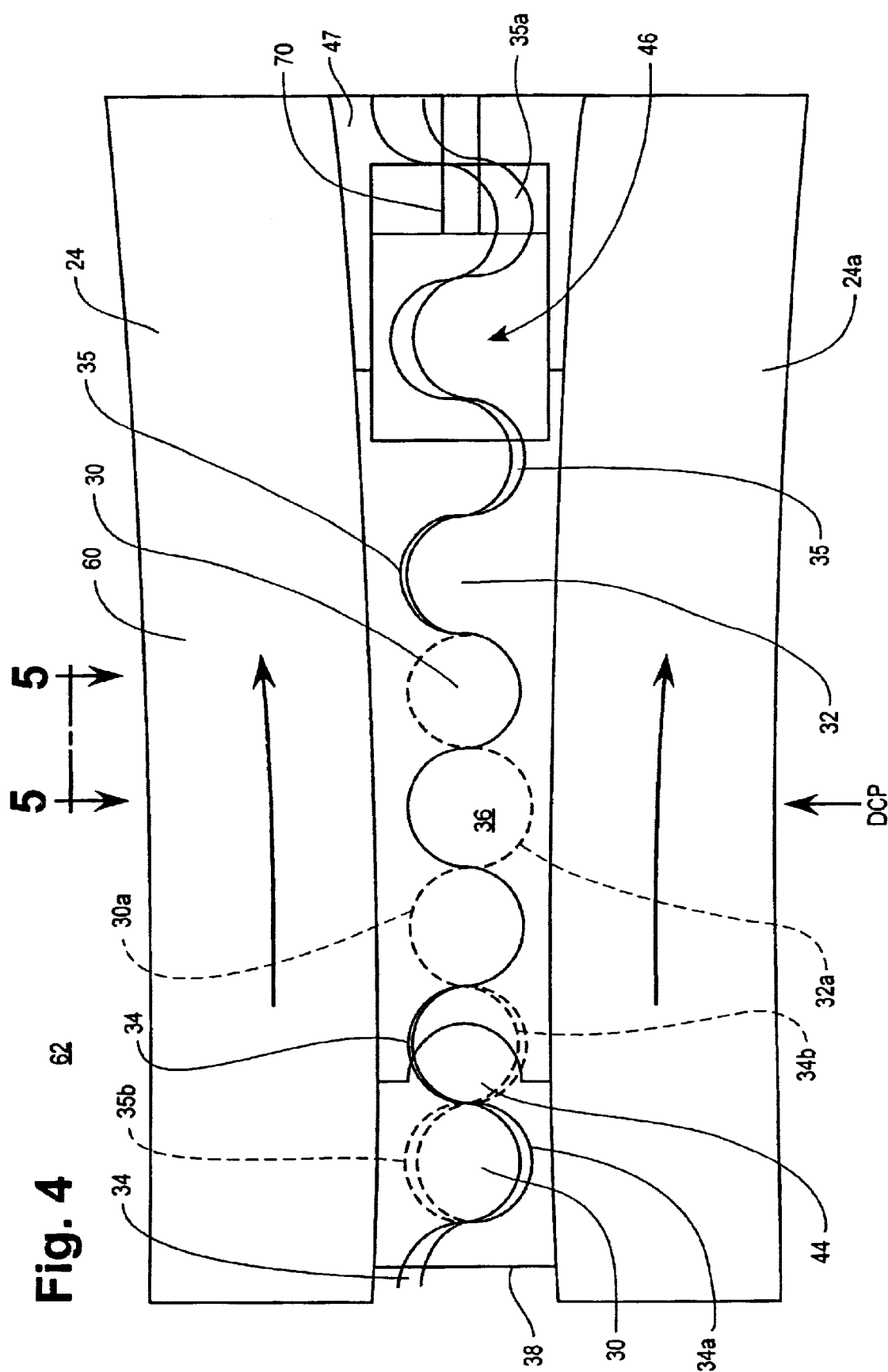

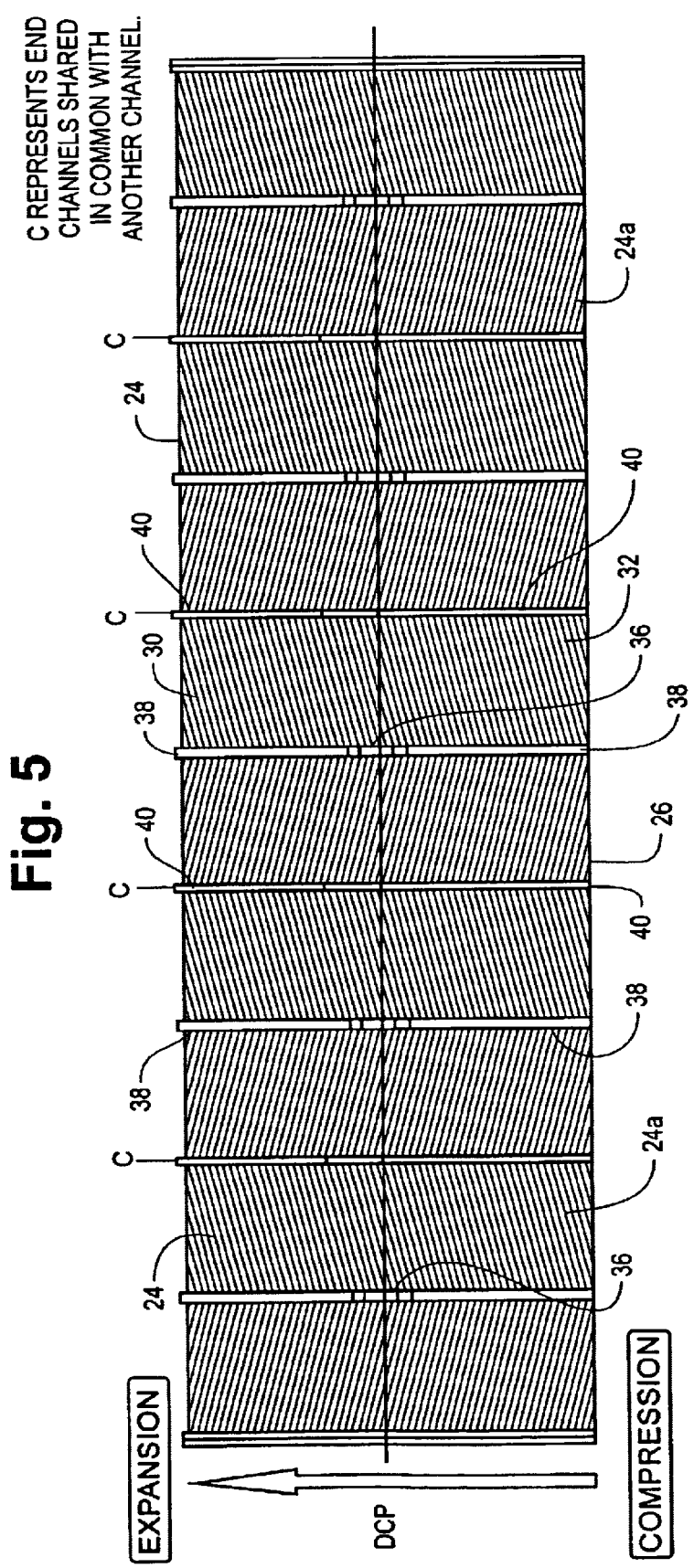

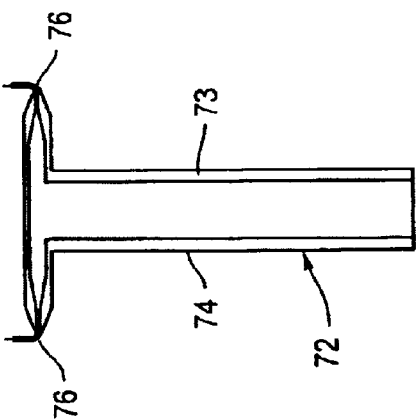
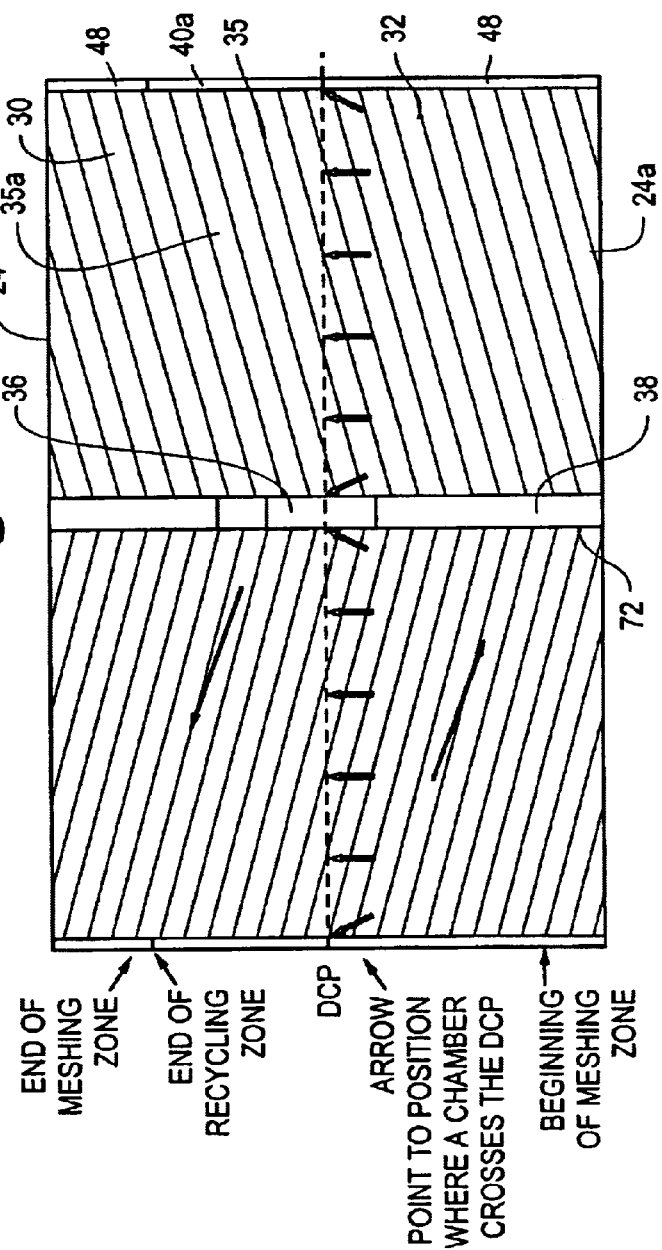

ROTARY GEAR DEVICE

BACKGROUND OF THE INVENTION

In Sager U.S. Pat. No. 5,845,617, a rotary gear pump is disclosed having meshing gears which define spaced teeth which extend helically in the general direction of the axis of each gear rotation. A flow inlet and outlet are provided, each being positioned in the housing to permit flow of fluids substantially longitudinally of the rotation axes between the meshing gears, as the gears rotate the teeth through a tooth meshing area. As the teeth of meshing gears start to engage each other, a series of chambers are formed which shrink in size, so that liquid or gas in the chambers is correspondingly compressed and expelled laterally, while the size of each chamber becomes zero at the dead center plane of the meshing gears. Thereafter, on the downstream side of the rotating gears, beyond the dead center plane, new chambers between the meshing teeth are formed, which chambers expand as rotation continues, and form a vacuum until material flows into these chambers from the sides of the rotating gears.

The above cited Sager patent proposes the utilization of gears of this type to provide internal combustion engines and pumps.

By this invention, improvements are provided to devices of the general type similar to those disclosed in the previously cited Sager patent, having added efficiency of operation and manufacture.

DESCRIPTION OF THE INVENTION

By this invention, a rotary gear device is provided which comprises a housing, and at least one pair of rotatable, meshing gears positioned within said housing. The meshing gears define spaced teeth which extend helically in the direction of the axis of each gear.

A flow inlet and a flow outlet are provided in the housing to permit the flow of fluids substantially longitudinally between the meshing gears as the gears rotate said teeth through a tooth-meshing area. The teeth of the meshing gears define first chambers which shrink in size to substantially zero volume as they rotate toward a dead center plane of the rotating gears. The teeth also further define second chambers formed between the teeth which are rotating away from the dead center plane. These second chambers increase in volume as they are rotated.

In accordance with this invention, at least one of the gears comprises a ring which defines the spaced teeth of the gear. The ring is positioned about the circumference of a rotatable disc, the rotatable disc being sized and positioned to tightly position the gear teeth together with the gear teeth of the other meshing gear in the tooth meshing area, but permitting a small amount of circumferential space about other portions of the circumference between said disc and the ring. This provides a self-adjustability to the gear system that can significantly reduce wear. Preferably, it is preferred for the number of teeth in one gear ring to be different from the number of teeth of the gear with which it meshes. Particularly, the number of gear teeth of one ring may differ from the number of gear teeth of the other gear which it engages by one to three teeth. Generally, the difference in the number of teeth between the number of teeth on the gear ring and the gear with which it meshes is typically no more than about two percent of the total number of teeth on the gear ring.

By this system, the individual teeth of the gear ring will engage different teeth of the gear which it engages with each revolution of the gear ring. This can even out the wear, to provide a longer lasting, low-wearing system.

Furthermore, the rotary gear device of this invention, of similar, basic design to the above, may have a substantially fixed-volume furnace chamber to receive fluid from the first chambers of the gears as they rotate toward the dead center plane, and to provide pressurized fluid to the second chambers as they are formed adjacent to the dead center plane and rotate away therefrom. The fuel inlet provides fuel to the first chambers between the gear teeth as the gear teeth form the first chambers rotating toward the dead center plane. The exhaust outlet is positioned to receive exhaust from the second chambers between the teeth as the teeth rotate away from the dead center plane.

Also, a recycle member may be provided for receiving pressurized exhaust, and recycling some of the exhaust. The recycle member comprises a circumferential groove positioned at one end of the gear teeth in a zone rotationally beyond the dead center plane, in the area where the chambers are expanding. This groove provides exhaust from second chambers at a rotational position farther away from the dead center plane to expanding second chambers at a rotational position nearer the dead center plane. Thus, as the chambers open to highly compressed, hot gas from the fixed-volume furnace chamber, some exhaust is coming into the same chambers from the other side, to facilitate formation of a shock wave to transmit energy to power expansion of the chambers, to provide more useful work and power efficiency.

The expanding chambers naturally form a vacuum as they expand. The onrush of highly pressurized gas into a vacuum is known be a fairly inefficient process. Thus, by providing some added gas into the other end of the opening chamber by means of the circumferential groove recycle member, some gas is provided to shock, permitting formation of the shock wave. Of course, a shock wave cannot exist in a vacuum.

This shock wave serves to transmit energy to power expansion of the chambers by interaction against the walls of the gear teeth, which, in turn powers the rotation of the gears, to provide efficiency to an internal combustion engine making use of the rotating gears of this invention.

In another aspect of this invention, in an engine of similar basic design to the above, the teeth of the gears define first and second chambers between them that communicate with the entry and exit ports of the furnace chamber at specific rotational positions of the gears. The entry and exit ports are respectively positioned at opposite sides of the dead center plane of the meshing gears. One pair of the gears has teeth that are rotationally displaced relative to the teeth of an adjacent pair of meshing gears on the other side of the same furnace chamber, so that the respective first and second chambers of the gear pairs communicate with the furnace chamber ports at differing rotational positions of the overall gear assembly. As a result of this, their times of opening to the furnace chamber is not simultaneous, and great turbulence is promoted which facilitates extremely fast, and complete mixing in the furnace chamber.

The rotary gear device of this invention may preferably comprise at least four coaxially positioned pairs of meshing gears in stacks, each gear of the stack being separated by an annular groove from the adjacent, coaxial gears, and the coaxially positioned, meshing gears being sealed with a pair of end seals. Also, a furnace chamber as described may be positioned in every other groove. Such ganged sets of meshing gears can provide greatly increased efficiency to the overall engine, when compared with separate pairs of gears. Furthermore, the sealing problems are greatly simplified, since they seal each other, and only need to be further sealed with a pair of end seals at each end of the stacks of gears.

The device of this invention may be used as an internal combustion engine for vehicles, or as an efficient, compact pump. It may also be used as a chemical reactor, since reactants can be greatly compressed and heated by running the device as a pump (in the opposite direction from internal combustion). By way of advantage, dangerous, explosive reactants may be so processed, because each reaction chamber (the first and second chambers) are tiny and carry a very small amount of reactant. Thus, should an explosion take place, damage may be minimal. At the same time, because of a large number of chambers which in aggregate may number, if desired, in the hundreds or thousands as formed with these rotating gears, so that a substantial amount of reaction product can be prepared on a continuous process basis, particularly in the case of fast, high temperature and pressure reactions.

DESCRIPTION OF THE DRAWINGS

FIG. 4 is a highly enlarged transverse sectional view showing the tooth engaging area of two of the engaging gears of FIG. 3.

FIG. 5 is a fragmentary, longitudinal sectional view a stack of gears from the engine of FIG. 1.

FIG. 6 is an enlarged fragmentary plan view of a portion of FIG. 5, showing part of the meshing gear and the furnace chamber.

DESCRIPTION OF SPECIFIC EMBODIMENT

Figure 1:
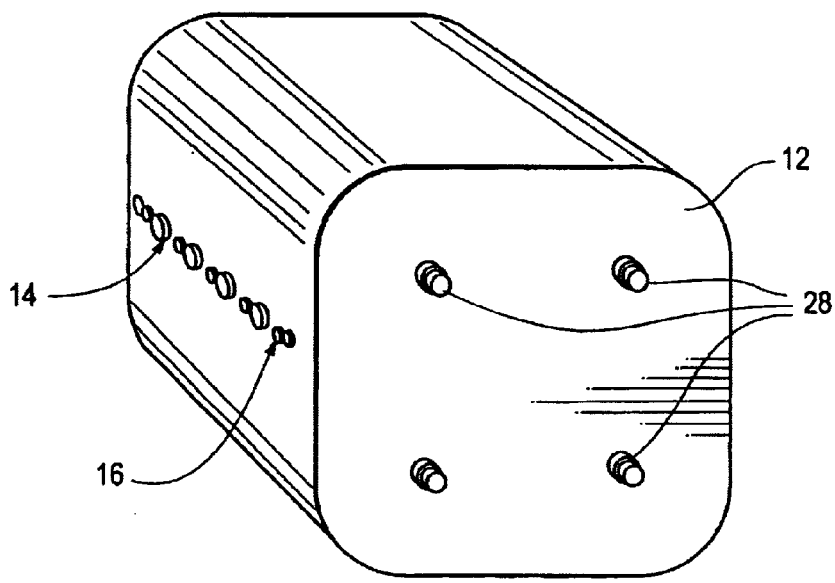
FIG. 1 is a front perspective view of an internal combustion engine made in accordance with this invention.
Figure 1A:
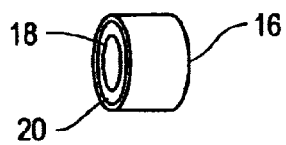
FIG. 1A is an enlarged perspective view of a water and fuel entry duct extending through the housing of the motor of FIG. 1.
Figure 2:
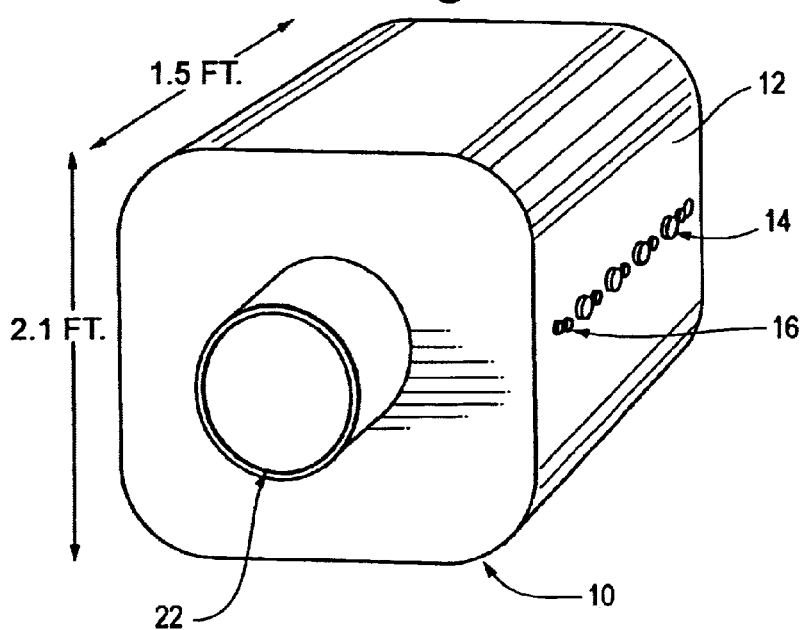
FIG. 2 is a back perspective view of the engine of FIG. 1.

Referring to the drawings, FIG. 1 shows a rotary gear device in accordance with this invention, specifically an internal combustion engine. Rotary gear device 10 has a housing 12, seen in both FIGS. 1 and 2. Air entry ducts 14 and water/fuel entry ducts 16 are shown. As more specifically shown in FIG. 1A, this fuel and water enters the system respectively through a central channel 18 for fuel and an outer annular channel 20 for water or, alternatively, the reverse is possible as well. The presence of water serves to provide both an increase in operation, efficiency and cooling, as well as a reduction of harmful emissions.

Exhaust outlet 22 is seen at one end of the engine. The typical engine shown may have a height of 2.1 feet and a length of 1.5 feet. A remarkably high theoretical horsepower can be achieved with such a small engine.

An array of rotatable, meshing gears 24 are positioned within housing 12. One view of which being shown in FIG. 3 and also FIG. 5. The array of gears 24 are shown to be engaging each other in a rectangular array of four gears, with a plurality of the gears 24 and 24a being ganged together in coaxial array as shown in FIG. 5, a stack 26 of ten coaxially joined gears 24 being shown. Thus, since there are four stacks 26 of gears shown, forty gears 24 are included in the engine of this specific embodiment. The respective ganged gear assemblies 26 rotate on separate shafts 28, as can be seen in FIG. 1.

Except as otherwise indicated in here, the functioning and operation of this engine can be in accordance with the previously cited Sager U.S. Pat. No. 5,845,617, and also Sager U.S. Pat. No. 5,108,275, disclosures of which are incorporated by reference.

As described in the previously cited Sager patents, the meshing gears define spaced teeth. These are not directly shown in FIG. 3 for purposes of simplicity of illustration, but they are shown in FIGS. 4–7 as respective teeth 30, 32 of the different meshing gears 24, 24a. As in the cited Sager patents, the meshing gears extend helically about the axis of each gear and in the axial direction. FIG. 5 shows that the sense of the helical spiral alternates from gear to gear in each coaxial stack 26.

The flow inlets 14, 16, and exhaust outlet 22 are positioned to permit the flow of fluid (air-fuel-water mixture) between the meshing gears 24, 24a as the gears mesh. See particularly, FIG. 4. Chambers are defined between the teeth of the meshing gears, which are filled with the fuel-air-water mixture. First chambers 34 are filled between teeth 30–32 rotationally upstream of the dead center plane "DCP" as indicated by the arrow DCP in FIG. 4. As teeth 30, 32 rotate toward the DCP, first chambers 34, 34a are reduced in size, providing high compression to the fuel vapor therein. As the volume of first chamber 34, 34a goes to essentially zero, the fluid therein escapes laterally (perpendicular to the plane of FIG. 4) into a fixed volume furnace chamber 36, which is positioned between teeth 30,32 of adjacent, coaxial gears of two gear pairs. The furnace chamber 36 is defined in one set of alternating grooves 38 (FIG. 5) which are positioned between respective pairs of meshing gears 24 and 24a, on one side of each. Another set of grooves 40 alternates with annular grooves 38, on the respective other sides of the respective gears pairs 24, 24a. Each of the gears is separated from other coaxial gears by a set of these annular grooves 38, 40.

Referring again to FIG. 4, the meshing of a pair of gears 24, 24a is shown. The furnace chamber 36 is positioned out of the plane of teeth 30, 32 but next to them, the respective rotating gear teeth 30, 32 each form one sidewall of the furnace chamber 30, and annular grooves 38 of the two meshing gears 24, 24a form the respective top and bottom of the furnace chamber 36. The other sidewall is provided by the next pair of rotating meshing gears on the other side of grooves 38 of the two gears. The ends of the furnace chamber are formed by stationary ceramic barriers 44, 46.

Figure 3:
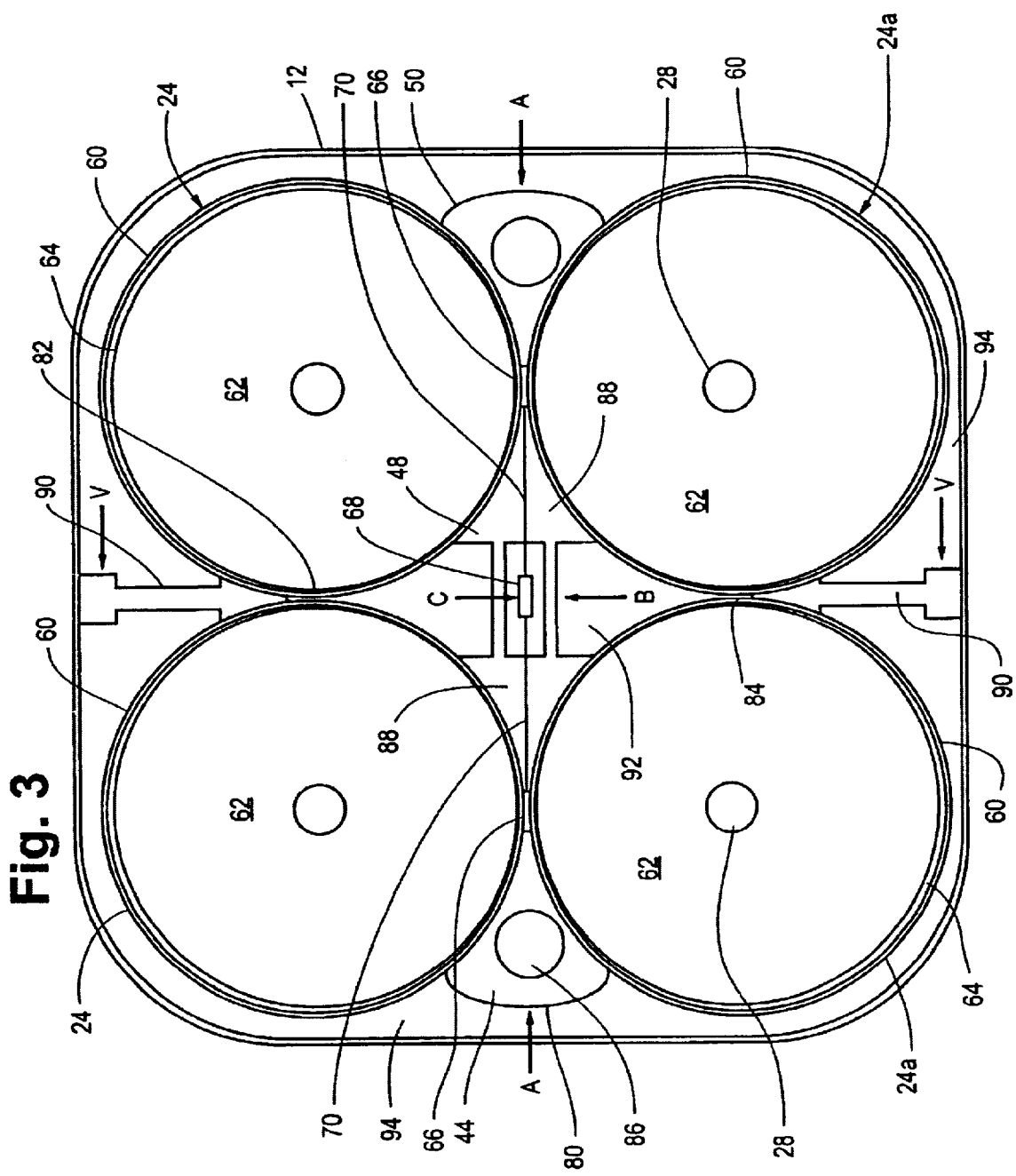
FIG. 3 is a transverse sectional view of the engine of FIG. 1.

The closing first chambers 34 expel their highly compressed, hot contents into the furnace chamber 36, where burning of the fuel under high compression takes place. In this process, it can be seen that gears 24, 24a and their respective teeth 30, 32 are rotating, but the furnace chamber 36 itself is stationary, with rear wall 44 and forward wall 46 being stationary, and being supported by external members 48, 50 as seen in FIG. 3. Accordingly, the hot, incandescent, burning gases in the furnace chamber 36 do not rotate with gears 24, 24a, but rather have a brief time for complete combustion under conditions of high turbulence, increased because first chambers 34 entering into furnace chamber 36 are at a different level than first chambers of the adjacent gears feeding the furnace from the opposite side. Both will rotate to the furnace chamber 36, expelling their compressed and heated contents into the furnace chamber, where combustion provides a great increase in compression and heat. This turbulent, variable entry of combusting fuel into the chamber increases combustion efficiency. The ultra hot fuel vapors make an exit from furnace chamber 36 through the second chambers 35, which form rotationally downstream of the dead center plane "DCP" between the respective teeth 30, 32, with an onrush of the incandescent high-pressure gases into the vacuum formed by the expanding a chambers 35. This pressurization of chambers 35 urges their expansion, which, in turn, converts into kinetic energy urging rotation of the respective gears in a manner similar to a piston in a cylinder in a conventional internal combustion engine. place in furnace chamber 36, until the ultra-hot, high pressure gases are expelled through the forming second chambers 35 between the gear teeth, rotationally downstream of the dead center plane "DCP". The gases move laterally out of the plane of the furnace chamber 36 into second chambers 35 (in a direction perpendicular to FIG. 4). There, ultra high pressure gases expand each of the chambers 35, urging gear rotation, until the chambers lose their enclosing nature by wide opening, resulting from the continued gear rotation.

At this point in the process, annular grooves 40 (FIG. 5) come into play, these grooves being positioned on the opposed sides of the gear teeth from furnace chambers 36 and grooves 38.

It is known that the entry of a pressurized fluid into an evacuated chamber is a fairly inefficient process for the transmission of kinetic energy. Thus, as the respective gears 30, 32a move away from dead center plane "DCP" and the respective second chambers 35 open, a portion of grooves 40 is open, while a portion of groove 40 is blocked respectively by portions of partitions comprising part of external member 48. The respective second chambers 35a defined between gears 30, 32 will release some of their exhaust contents into the open portion 40a of groove 40 at a location rotationally downstream from other chambers 35 which are closer to the dead center plane. As these smaller chambers 35 start to open, they create a vacuum by the opening. Exhaust passes through the open portion 40a of annular groove 40 from chambers 35a into such chambers 35 as, or shortly before the time that, explosively hot gas enters the same chambers 35 from the furnace chamber 36 at the other end. Thus, a shock wave can be produced in the respective chambers 35, which greatly increases the transfer of kinetic energy to the gears, resulting in more rotational energy being provided by the engine through rotary shafts 28.

Further in accordance with this invention, at least one and preferably all of gears 24, 24a each comprise a ring 60 which defines the respective spaced teeth 30, 32 of the gears. Each ring 60 is positioned about the circumference of a rotatable disk 62 which, in turn, is connected to one of the rotor shafts 28. Rotatable disks 62 are sized and positioned to position the gear teeth firmly together in their meshing relationship as shown in FIG. 4, for example, so that the gear teeth mesh in the tooth meshing area. However, a small amount of circumferential space 64 (such as 0.04 inch) is provided about other portions of the circumference between each disk 62 and ring 60. In other words, the outer diameter of disk 62 is slightly less than the inner diameter of ring 60, so there is a little bit of loose play, and ring 60 can rotate on disk 62, except for a tight fit between disk and ring 62 at the tooth meshing zone 66. Because of the tight fit at tooth meshing zone 66, rotational energy is reliably transferred from rings 60, to disks 62 and rotary shafts 28.

Furthermore, the number of teeth of gear 24 can be slightly different from the number of teeth of gear 24a, typically a difference one or three teeth out of a total of one to three hundred teeth preferred in each entire gear, although the precise total number of teeth in the gears is not critical. Because of this slight difference in the number of teeth between the respective gears 24, 24a, with each rotation, each gear tooth 24 will rest between a different set of gear teeth 24a, without any slippage of the respective gear rings 60 on the respective disks 62. The respective shape of the gear teeth of gears 24, 24a may be essentially identical, and little loss of sealing possible upon proper proportioning, even where there is a slight difference in the number of gear teeth in gears 24, 24a. By this technique, wear can be evened out, to provide a longer lasting, low-wearing system.

Furthermore, as illustrated in FIG. 4, the gear teeth of one set of gears, 24, 24a is shown, with furnace chamber 36 being shown in annular groove 38. Annular groove 38 is positioned above the respective gear teeth 30, 32 shown in FIG. 4. See FIG. 5 for an overall view taken perpendicular to FIG. 4.

As one rises further from the plane of FIG. 4 above furnace chamber 36, another set of gear teeth 30a, 32a will be encountered in the adjacent gear 24. This second set of gears has gear teeth 30a, 32a which are rotationally shifted by about one gear tooth width compared with the respective gear teeth 30, 32 which are shown in fuel lines in FIG. 4. These additional gear teeth 30a, 32a are partially shown in dotted lines by FIG. 4. An advantage of this rotational shift between the teeth of the adjacent gears is that the respective first and second chambers 34b, 35b that they form will be rotationally shifted from the chambers 34, 35. Thus, as the gears rotate, furnace 36 will receive a blast of compressed gas from chamber 34 along with a corresponding blast of gas from chamber 34b lower down in furnace chamber 36 and on the other side of the chamber. Then, upon another unit of rotation, another blast of gas will come into the lower part of chamber 36 from chamber 34a on one side of the furnace chamber 36, while a blast of gas in the upper portion of furnace chamber 36 from the other side will come in from first chamber 35b. This resulting variable entry of gas from the respective collapsing first chambers will cause great turbulence and, accordingly, great combustion efficiency in furnace chambers 36.

Similarly, the second, expanding outlet chambers 35 work in the same manner, to provide extremes of turbulence.

The volume of furnace chamber 36 is adjustable, being approximately 90 cubic millimeters. This is a sufficient size to hold the compressed contents of several first chambers at once. Thus, the mixing can occur at a rate that is many orders of magnitude greater than with ordinary diesel engines. For engines which deliver power at one level only, the furnace vacuum need not be variable.

As previously stated, only the ends of the furnace's wall, members 44 and 46, are stationary, and are preferably made of ceramic. The sides, top, and bottom of the furnace are made of rotating gears. Because they occupy the furnace zone only about one percent of the time, no special cooling system is needed for this, the hottest point of the engine.

As shown, forward wall 46 may be made of ceramic and is adjustable, and serves to block variable amounts of the ends of the respective second chambers 35, 35b for adjustment of the pressure and temperature in furnace 36, and the flow into the second chambers. Adjustable wall 46 is carried in recess of stationary barrier wall 47, which may also be made of ceramic.

The position of forward wall 46 will be adjusted by the adjustments of threaded member 68 which respect to threaded shafts 70. As member 68 is rotated, each forward wall member 46 moves inwardly or outwardly in each of the respective meshing zones 66. (FIGS. 3 and 4). The structure of the furnace in the respective two meshing zones 66 can be identical and is as shown in FIG. 4. Also, with respect to the other coaxial gears in each of the ganged gear stacks 26, they may be similar, so that all of the gears participate in power generation in the manner shown individually in the drawings.

FIG. 6 shows how an air-fuel-water mixture can pass from air, water and fuel entry ducts 14, 16 into annular grooves 38, to be taken up by the first chambers 34 between teeth 30, 32 as they form, to be compressed and transferred to furnace 36 in the manner specifically shown in FIG. 4. Fuel line 74 and water line 73 are locked together at the outer tips 76 of the T-shaped structure 72 found in each annular groove 38 between gears 24a. The mixed fuel and water enters the forming first chambers, along with air, which may enter in ambient manner since annular groove 38 is open at a position adjacent to dead center plane "DCP."

Barrier 80 holds compression vanes to be discussed below and provides rear wall 44 for confinement on one end for furnace 36. Wall 44 has a hole 86 to maintain equal pressure on both sides.

Figure 7:
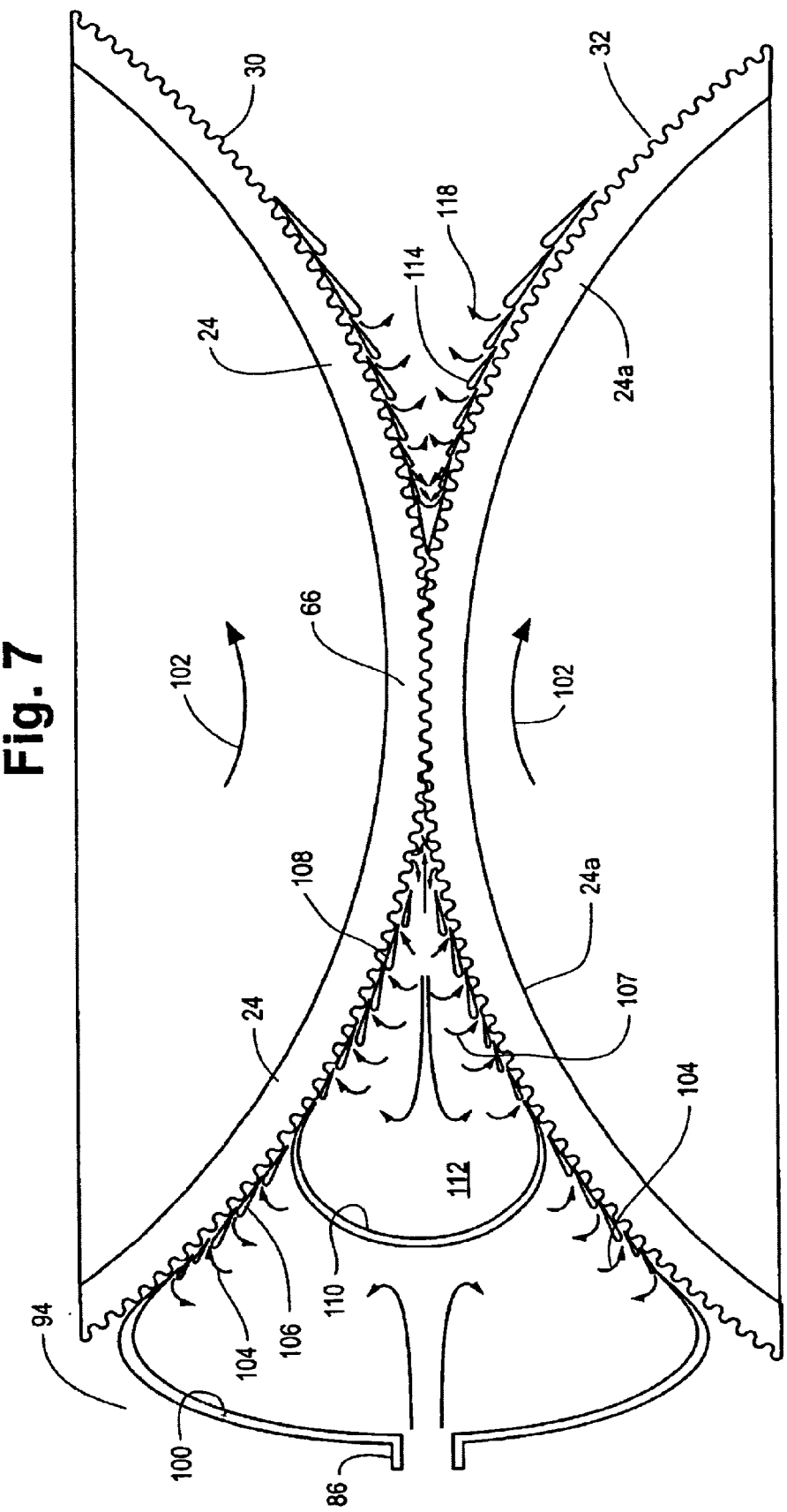
FIG. 7 is an enlarged sectional view of the vane system used to direct gas flow through the meshing gears, shown at a position axially spaced from the sides of the engaging gears shown at a position axially spaced from the sides of the engaging gears.

Internal barrier member 88 also holds the expansion vanes of FIG. 7 and it furnishes confinement at the inner end of furnace 36 in the form of the adjustable barrier walls 46, 47, as part of member 88.

While the teeth of both gear pairs 24, 24a mesh together as described, the respective gears 24 also mesh with each other at a position 82 of 90 degrees apart from teeth meshing area 66. Similarly, gears 24a mesh together at position 84. Barriers 90 provide dividers to contain the exhaust in the central region 92 surrounded by the four rotors. Volume 94 between housing 12 and the outer portions of the gears, can remain under a substantial vacuum as air is pumped out by the rotating gear teeth.

Turning to FIG. 7, a flow vane system is provided, serving a function similar to the vane system illustrated in the previously cited Sager patent 5,845,617. Air/fuel entering through entry duct and through partition 100 flows between vanes 106 into an evacuated area between the gear. teeth moving in direction of rotation 102. The air/fuel inlet may be atmospheric or supercharged, and it is introduced gradually into the first chambers 34, 34a through vanes 106 and then a series of jets 107 of increasing size as shown, the jets being defined by vanes 108. The pressure rises gradually with rotation for each individual chamber between gear teeth. Because of the vacuum, the jets 104, 107 transfer forward momentum to the respective gear rings and gear teeth. Also, the gas of jets 104, 107 cools, which can increase both the capacity and efficiency of the engine.

The second vane system 108 and inner partition 110 counteract the negative effect of the pressure rise at the front of the meshing zone as the teeth are coming together and reducing the size of the first chambers. This is counteracted by raising the pressure in volume 112 inside of the partition 110, which is accomplished by restricting the volume by means of partition 110.

On the expansion side of the rotating gears, more vanes 114 are provided to conduct the final stage of decompression of the exhaust in the second chambers after the teeth have disconnected. Secondjets 118 from the decompressing chambers are directed in a direction to impel rotation of the gears in the desired direction for further efficiency of operation. Exhaust is directed to rear exhaust port 22. The surfaces of the two gears 30, 32 may never touch with a sliding motion except exactly at the DCP (the gears touch without sliding motion when the cusps pass through the DCP). Since the region of touching is moving toward the furnace at preferably supersonic speed there would appear to be no way the surfaces could actually touch since they would generally be separated by a very thin layer of compressed air. This air lubrication would appear to make for highly efficient operation.

The above has been offered for illustrative purposes only, and is not intended to limit the scope of the invention, which is as defined in the claims below.

That which is claimed is:

1. A rotary gear device which comprises a housing, and at least one pair of rotatable, meshing gears positioned within said housing, said meshing gears defining spaced teeth which extend helically in the direction of the axis of each gear;

a flow inlet and a flow outlet, each positioned in the housing to permit flow of fluid substantially longitudinally between the meshing gears as said gears rotate said teeth through a tooth meshing area, the teeth of said meshing gears defining first chambers which move substantially longitudinally while shrinking in size to substantially zero volume as they rotate toward a dead center plane, and further defining second chambers formed between said spaced teeth rotating away from said dead center plane and increasing in volume, at least one of said gears comprising a ring which defines the spaced teeth of said gear, said ring being positioned about the circumference of a rotatable disc, said rotatable disc being sized and positioned to firmly press against said ring and to position the gear teeth together with the gear teeth of the meshing gear in said tooth meshing area, but permitting a small amount of circumferential space at regions other than said tooth meshing area about the circumference between said disc and said ring.

2. The rotary gear device of claim 1 in which the number of teeth in said gear ring are different from the number of teeth of the gear with which the gear ring meshes.

3. The rotary gear device of claim 2 in which said number of gear teeth of said ring differs from the number of gear teeth of the other gear by one to three teeth.

4. The rotary gear device of claim 2 in which the difference in the number of teeth is no more than about two percent.

5. A rotary gear motor which comprises a housing, and at least one pair of rotatable, meshing gears positioned within said housing, said meshing gears defining spaced teeth which extend helically in the general direction of the axis in each gear;

a fuel inlet and an exhaust outlet, each positioned in the housing to permit flow of fluids substantially longitudinally between the meshing gears as said gears rotate said teeth through a tooth meshing area, the teeth of said meshing gears defining first chambers which move substantially longitudinally while shrinking in size to substantially zero volume as they rotate toward a dead center plane, and defining second chambers formed between said spaced teeth rotating away from said dead center plane and increasing in volume;

a substantially fixed volume furnace chamber positioned to receive fluid from said first chambers of the gears as they rotate toward the dead center plane and to provide pressurized fluid to the said second chambers as they are formed adjacent said dead center plane and rotate away therefrom;

said fuel inlet being positioned to provide fuel to spaces between said first gear teeth as said gear teeth forms said chambers rotating toward the dead center plane, and said exhaust outlet positioned to receive exhaust from spaces between said teeth as said teeth rotate away from the dead center plane; a recycle member for receiving pressurized exhaust and recycling some of said exhaust, said recycle member comprising a circumferential groove positioned at one end of said gear teeth in a zone rotationally farther beyond the dead center plane where said second chambers are expanding, to provide exhaust to said expanding second chambers at a nearer rotational position to the dead center plane, where said second chambers open to highly compressed fluid in said fixed volume furnace chamber, to facilitate formation of a shock wave to transmit energy to power expansion of said second chambers.

6. A rotary gear device which comprises a housing and a plurality of pairs of coaxial, rotatable meshing gears positioned within said housing, said meshing gears defining spaced teeth which extend helically in the general direction of the axis of each gear; a flow inlet and a flow outlet, each positioned in the housing to permit flow of fluid substantially longitudinally between the meshing gears as said gears rotate said teeth through a tooth meshing area, the teeth of said meshing gears defining first chambers which shrink in size to substantially zero volume as they rotate toward a dead center plane, and defining second chambers formed between said spaced teeth rotating away from said dead center plane and increasing in volume, to receive high pressure fluid such as burning fuel to provide pressure to expand said second chambers and to drive rotation of said rotary gear device, and channels to recycle such expanding fluid from a rotationally downstream area to a rotationally upstream area of said expanding second chambers to provide such exhaust material to said upstream expanding second chambers from a gear tooth end opposed to the end of said gear teeth which receives such high pressure fluid, to facilitate formation of a shock wave in said second chambers for improved creation of kinetic energy to drive gear rotation.

7. A rotary gear device which comprises a housing, and a plurality of pairs of coaxial, rotatable, meshing gears positioned within said housing, said meshing gears defining spaced teeth which extend helically in the general direction of the axis of each gear;

a flow inlet and a flow outlet, each positioned in the housing to permit flow of fluid between the meshing gears as said gears rotate said teeth through a tooth meshing area, the teeth of said meshing gears defining first chambers which shrink in size to substantially zero volume as they rotate toward a dead center plane, and defining second chambers formed between said spaced teeth rotating away from said- dead center plane and increasing in volume;

a substantially fixed volume furnace chamber positioned between gear pairs to receive fluid from said first chambers of the gear pairs as they rotate toward the dead center plane and to provide pressurized fluid to said second chambers as they are formed adjacent said dead center plane and rotate away therefrom;

the teeth of the gears defining said first and second chambers between them that communicate with entry and exit ports of the furnace chamber at specific rotational positions of the gears, the entry and exit ports being respectively positioned at opposite sides of the dead center plane of said meshing gears, one of said pairs of gears having teeth that are rotationally displaced relative to the teeth of the adjacent pair of meshing gears on the other side of the furnace chamber, so that the respective first chambers of the gear pairs communicate with the furnace chamber ports at differing rotational positions of said gears, whereby turbulence is promoted in said furnace chamber.

8. The rotary gear device of claim 7 which comprises an internal combustion engine.

9. The rotary gear device of claim 7 which comprises at least four coaxially positioned pairs of meshing gears, each gear being separated by alternating annular first and second grooves from adjacent, coaxial gears, said gear pairs being sealed with a pair of end seals, and a said furnace chamber defined in every first groove.

10. The rotary gear device of claim 9 in which the coaxial gears of said pairs of meshing gears are integrally connected together.

11. The rotary gear device of claim 9 in which the sense of the helical spiral of adjacent coaxial gear teeth alternates from gear to gear.

12. The rotary gear device of claim 9 in which said annular second grooves which do not define said furnace chamber comprise a recycle member for receiving pressurized exhaust and recycling some of the said exhaust, said second groove receiving blocking walls to form a channel for exhaust to pass exhaust from a rotationally downstream region to a rotationally upstream region of said expanding second chambers nearer to the dead center plane of said rotary gears, to provide such exhaust material to said expanding second chambers of the rotationally upstream region while high pressure fluid from said furnace chamber in an adjacent said first groove passes into said second chambers from another end of said second chambers, to facilitate formation of a shock wave in said second chambers for improved creation of kinetic energy to drive gear rotation.

13. The rotary gear device of claim 12 in which the coaxial gears of said pairs of meshing gears are integrally connected together.

14. The rotary gear device of claim 13 in which the sense of the helical spiral of adjacent, coaxial gear teeth alternates from gear to gear.

15. The rotary gear device of claim 14 in which at least one of said gears comprises a ring which defines the spaced teeth of said gear, said ring being positioned about the circumference of a rotatable disc, said rotatable disc being sized and positioned to firmly press against said ring and to position the gear teeth together with the gear teeth of a meshing gear in said tooth meshing area, but permitting a small amount of circumferential space at regions other than said tooth meshing area about the circumference between said disc and said ring, the number of teeth in said gear ring being different from the number of teeth of the gear with which it meshes.

16. The rotary gear device of claim 15 in which said number of gear teeth of said ring differs from the number of gear teeth of the other gear by 1–3 teeth.

17. A rotary gear device which comprises a housing, and a plurality of pairs of coaxial, rotatable, meshing gears positioned within said housing, said meshing gears defining spaced teeth which extend helically in the general direction of the axis of each gear;

a flow inlet and a flow outlet, each positioned in the housing to permit flow of fluids substantially longitudinally between the meshing gears as said gears rotate said teeth through a tooth meshing area, the teeth of said meshing gears defining first chambers which shrink in size to substantially zero volume as they rotate toward a dead center plane, and defining second chambers formed between said spaced teeth rotating away from said dead center plane and increasing in volume;

a substantially fixed volume furnace chamber positioned between gear pairs to receive fluid from said first chambers of the gear pairs as they rotate toward the dead center plane and to provide pressurized fluid to said second chambers as they are formed adjacent said dead center plane and rotate away therefrom, the gears of said pairs comprising at least four coaxially positioned pairs of meshing gears, each gear being separated by an annular groove from adjacent coaxial gears, said gear pairs being sealed with a pair of end seals, and said furnace chamber defined in every other groove.

18. The rotary gear device of claim 17 in which the grooves which do not define said furnace chamber comprise a recycle member for receiving pressurized exhaust and recycling some of said exhaust, said circumferential groove containing blocking walls to form a channel to pass exhaust from a rotationally downstream area to a rotationally upstream area of said expanding second chambers nearer to the dead center plane of said rotary gears, to provide such exhaust material to said expanding second chambers while high pressure fluid from said furnace chamber in an adjacent said groove passes into said second chambers from another end of said second chambers, to facilitate formation of a shock wave in said second chambers for improved creation of kinetic energy to drive gear rotation.

19. The rotary gear device of claim 17 in which the coaxial gears of said pairs of meshing gears are integrally connected together.

20. The rotary gear device of claim 17 in which the sense of the helical spiral of adjacent coaxial gear teeth alternates from gear to gear.

* * * * *